(12) United States Patent
Watt et al.

(10) Patent No.: US 8,035,358 B2
(45) Date of Patent: Oct. 11, 2011

(54) BINARY VOLTAGE REGULATOR

(75) Inventors: Julian Alexander Watt, New Hartford, CT (US); Thomas Charles Gmuer, Southbury, CT (US)

(73) Assignee: Superior Electric Holding Group LLC, Farmington, CT (US)

(*) Notice: Subject to any disclaimer, the term of this patent is extended or adjusted under 35 U.S.C. 154(b) by 506 days.

(21) Appl. No.: 12/212,827

(22) Filed: Sep. 18, 2008

(65) Prior Publication Data

US 2010/0066343 A1 Mar. 18, 2010

(51) Int. Cl.
*G05F 1/253* (2006.01)
(52) U.S. Cl. ..................... 323/262; 363/21.08
(58) Field of Classification Search ............. 323/222, 323/225, 237, 261, 272, 282–299, 224, 262; 363/21.08, 25, 55, 65, 97, 37, 21.06
See application file for complete search history.

(56) References Cited

U.S. PATENT DOCUMENTS 3,984,799 A * 10/1976 Fletcher et al. ............ 363/21.08
5,373,433 A * 12/1994 Thomas ........................... 363/43

FOREIGN PATENT DOCUMENTS

| DE | 34 22 961 A1 | 12/1985 |
| EP | 0 841 742 A2 | 5/1998 |
| EP | 1 054 502 A1 | 11/2000 |
| JP | 01-122325 | 5/1989 |
| SU | 896723 | 1/1982 |
| WO | WO 93/22827 | 11/1993 |

OTHER PUBLICATIONS

International Search Report issued in corresponding international application PCT/US2009/057405 (Feb. 9, 2010).
Written Opinion issued in corresponding international application PCT/US2009/057405 (Feb. 9, 2010).

* cited by examiner

*Primary Examiner* — Rajnikant Patel
(74) *Attorney, Agent, or Firm* — Dykema Gossett PLLC

(57) ABSTRACT

A voltage regulator is provided that includes a plurality of buck-boost transformers each having primary and secondary windings. The secondary windings of the transformers are electrically disposed in series between a source and a load. Each transformer is controlled by a plurality of control switches configured to control the voltage across the primary winding of a corresponding transformer. A controller monitors the output voltage and generates control signals for the switches. The transformers generate different voltage level changes in between the source and load and the voltages across the primary windings are capable of assuming opposite polarities to enable scaling of resolution and range. The voltage regulator efficiently regulates power with relatively few or no moving parts and also partially protects the power switching components by removing them from the path of the load current thereby producing a device that is smaller in size, costs less and is more reliable.

20 Claims, 2 Drawing Sheets

BINARY VOLTAGE REGULATOR

BACKGROUND OF THE INVENTION

1. Field of the Invention

This invention relates to a voltage regulator and, in particular, to a voltage regulator that provides enhanced resolution over a larger range of voltage while also achieving improvements in size, cost and reliability.

2. Discussion of Related Art

Voltage regulators are provided to maintain voltage levels at a predetermined level or within a predetermined range. Voltage regulators are used to protect devices used, for example, in broadcast transmission and telecommunications, computers, manufacturing and industrial control by insuring that voltage provided from a power source to a load is within the operating limits of the load.

There are a variety of known voltage regulators. One conventional voltage regulator includes a buck boost transformer disposed between a source and a load. The buck-boost transformer has a secondary winding in series with the line voltage source. Voltage to the primary winding of the buck-boost transformer is controlled by a variable autotransformer resulting in the addition or subtraction of voltage from the line voltage. A movable brush in the autotransformer is controlled by a motor which itself is controlled by a controller monitoring the output voltage. This conventional design is relatively complicated and has a large number of moving parts that limit the reliability of the device. Further, the device has a relatively slow response time to changes in voltage and the components must be sized to several times the corrective power rating of the load.

An improvement to the above-described device integrates the buck-boost transformer and autotransformer. In this device, a first part of the autotransformer winding is in series with the line voltage. A second part of the winding determines the total corrective range the first part can provide and the connection point in this first part of the winding determines what percentage of this corrective voltage that can be added to and what percentage can be removed from the line voltage. The brush of the autotransformer is placed in series between the source and load and is again controlled by a motor operating under the control of a controller monitoring the output voltage. Although this integrated device results in a slight reduction in the number of components, the device still suffers from a relatively complicated design, moving parts and slow response time and the components must again be sized to several times the corrective power rating of the load.

Another conventional voltage regulator is a ferro-resonant transformer. In this device, the magnetic core of the transformer is substantially saturated. A secondary winding draws power from a primary winding to replace power delivered to the load. Because of the saturation of the core, however, the impact of any change in voltage across the primary winding on the voltage across the secondary winding is limited thereby allowing the secondary winding to maintain a relatively constant voltage. Another secondary winding forms part of a resonant tank circuit which helps to maintain saturation of the core. This device suffers from relatively large audible noise, is relatively inefficient thereby leading to the production of excess heat, and creates distortions in the voltage waveforms. The device also is current limiting and must also be sized to handle the maximum power of the load. Further, the device is susceptible to line frequency changes because it is designed for a fixed frequency. The device also can suffer from poor resolution in the output voltage.

Another conventional voltage regulator includes an autotransformer or isolation transformer in which taps on the transformer are selected in response to semiconductor switches. These devices generally suffer from poor output resolution because increased resolution requires additional switches which then increase the cost of the device and reduces the reliability of the device. The switches are particularly susceptible to damage from overload conditions or load transients because they are located in the circuit between the source and load. The device must therefore again be sized to handle the maximum power of the load.

Another conventional voltage regulator functions in a manner similar to the ferro-resonant transformer. In this device, an additional control winding is supplied with direct current to cause saturation of the transformer core. Saturation of the core enables the secondary winding to maintain a substantially constant voltage despite variations in the line voltage on the primary winding. This device, however, again creates distortions in the voltage waveforms (requiring significant filtering to reduce these distortions), is relatively inefficient, and must be sized to handle the maximum power of the load.

Yet another voltage regulator includes a plurality of buck-boost transformers having secondary windings disposed in series between the source and load. Delivery of current to the primary windings of the transformers is controlled such that each transformer is capable of adding to, or subtracting from, the line voltage. Each transformer is configured to generate the same voltage level change between the source and the load. As a result, the device is incapable of achieving sufficient voltage resolution over a large voltage range. For example, if the transformers were configured to generate a voltage level change with relatively high resolution (e.g., 1%), ten separate transformers would be required to achieve only a 10% range. Similarly, if the transformers were configured to permit adjustment over a large voltage range, either the resolution of the transformers would need to be reduced to limit the number of transformers (e.g., four transformers at 5% resolution for a 20% range) or a large number of transformers would have to be added (e.g., twenty transformers at 1% resolution for a 20% range) increasing the size and cost of the device and reducing its reliability. This device is also sensitive to changes in power requirements for different loads thereby requiring recalibration of switching elements.

Yet another conventional voltage regulator includes a plurality of buck-boost transformers having secondary windings disposed in series between the source and load wherein the transformers generate different voltage level changes in the voltage between the source and the load. Although permitting some improvements in voltage resolution and range, this conventional device has several drawbacks. First, the device includes three primary windings in each transformer-one for the addition of voltage, one for subtraction of voltage and one for a shorted (null) voltage. The large number of windings increases the component cost and reduces its reliability and requires sizing the transformers to handle relatively high power requirements. Second, current delivered to the primary windings of each transformer had to be of the same polarity or a null polarity limiting the ability to obtain sufficient resolution of voltage levels without a large number of transformers.

The inventors herein have recognized a need for a voltage regulator that will minimize and/or eliminate one or more of the above-identified deficiencies.

SUMMARY OF THE INVENTION

The present invention provides a voltage regulator.

A voltage regulator in accordance with one embodiment of the present invention includes a first buck-boost transformer having a primary winding and a secondary winding, the secondary winding of the first buck-boost transformer electrically disposed between a source and a load. A first plurality of control switches is configured to control a first voltage across the primary winding of the first buck-boost transformer at a moment in time. The voltage regulator further includes a second buck-boost transformer having a primary winding and a secondary winding, the secondary winding of the second buck-boost transformer electrically disposed between the source and the load in series with the secondary winding of the first buck-boost transformer. A second plurality of control switches is configured to control a second voltage across the primary winding of the second buck-boost transformer at the moment in time. The voltage regulator further includes a controller configured to determine an output voltage and to generate control signals for the first and second pluralities of control switches in response to the output voltage. The first buck-boost transformer is configured to generate a first voltage level change in voltage between the source and the load. The second buck-boost transformer is configured to generate a second voltage level change in voltage between the source and the load, the second voltage level change different from the first voltage level change. Finally, the first and second voltages are capable of assuming opposite polarities at the moment in time.

A voltage regulator in accordance with another embodiment of the present invention includes a first buck-boost transformer having a primary winding and a secondary winding, the secondary winding of the first buck-boost transformer electrically disposed between a source and a load. A first plurality of control switches is configured to control a first voltage across the primary winding of the first buck-boost transformer at a moment in time. The voltage regulator further includes a second buck-boost transformer having a primary winding and a secondary winding, the secondary winding of the second buck-boost transformer electrically disposed between the source and the load in series with the secondary winding of the first buck-boost transformer. A second plurality of control switches is configured to control a second voltage across the primary winding of the second buck-boost transformer at the moment in time. The voltage regulator further includes a controller configured to determine an output voltage and to generate control signals for the first and second pluralities of control switches in response to the output voltage. The first buck-boost transformer is configured to generate a first voltage level change in voltage between the source and the load. The second buck-boost transformer is configured to generate a second voltage level change in voltage between the source and the load, the second voltage level change different from the first voltage level change. Finally, the first voltage across the primary winding of the first buck-boost transformer assumes one of a positive polarity and a negative polarity at the moment in time and assumes another of the positive polarity and the negative polarity at another moment in time.

A voltage regulator in accordance with the present invention represents an improvement over conventional devices. By using transformers configured to generate different voltage level changes in voltage and enabling voltages of opposed polarities, the voltage regulator enables a high voltage resolution over a large voltage range using relatively few transformers. For example, the invention may include three transformers configured to generate voltage changes of 1%, 3% and 9%, respectively, each of which may be used to add or subtract voltage from the line or may assume a neutral (null) state. The resulting device has a high resolution of +/−1% over a relatively large range of +/−13% using only three transformers. The overall size, cost and weight of the regulator is therefore less than many conventional devices yet achieves increased resolution and range. The device also uses relatively few or no moving components and fewer components overall relative to conventional devices thereby increasing the reliability of the device. Further, the control switches are located outside of the path of the load current on the primary side of the transformers thereby permitting smaller switching components and partial protection against faults/transients.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
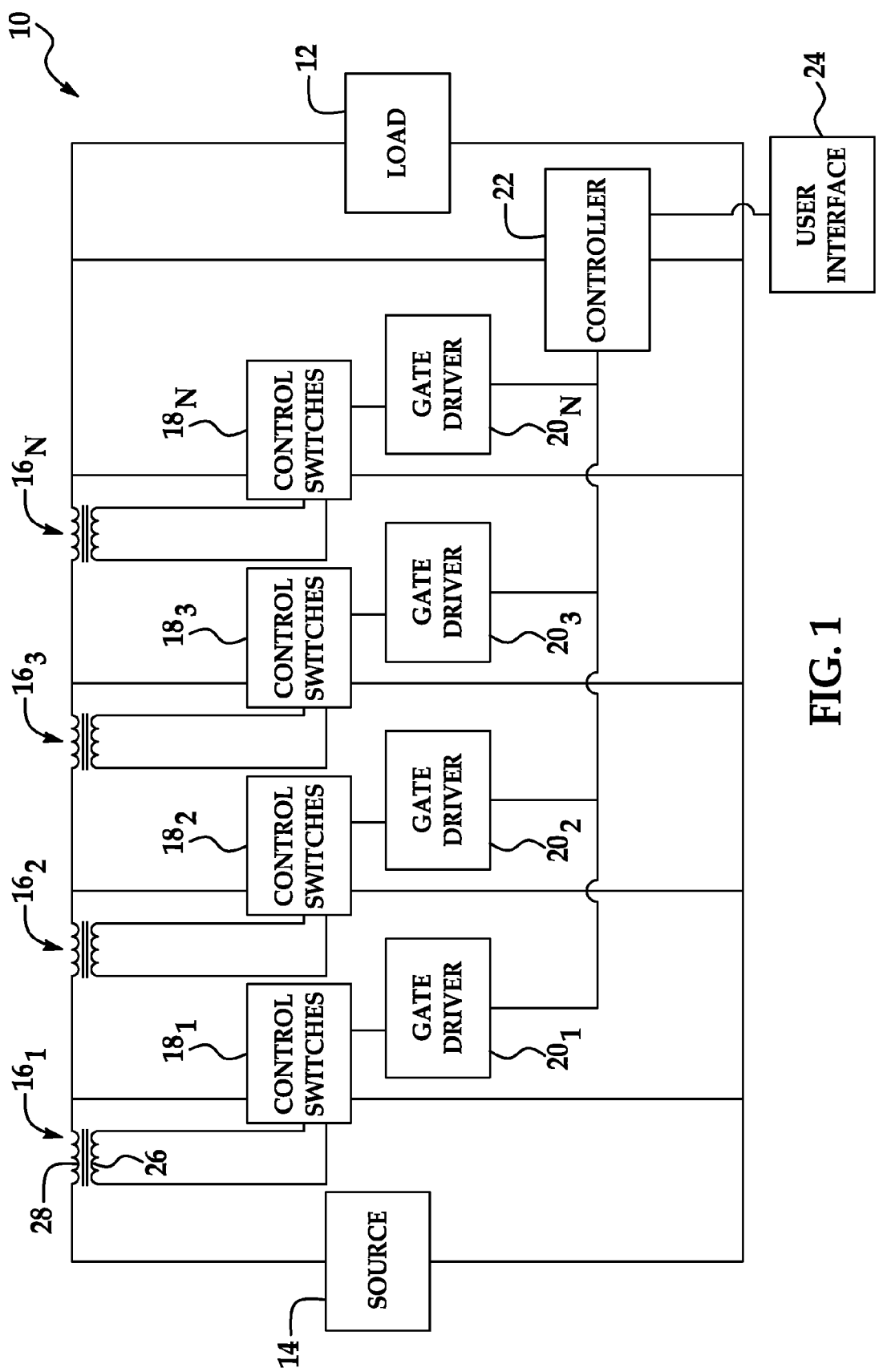
FIG. 1 is a schematic and block diagram illustrating a voltage regulator in accordance with one embodiment of the present invention.

Referring now to the drawings wherein like reference numerals are used to identify identical components in the various views, FIG. 1 illustrates a voltage regulator 10 in accordance with one embodiment of the present invention. Voltage regulator 10 is provided to maintain the voltage levels across a load 12 at a predetermined level or within a predetermined range despite variations in voltage provided by a power source 14, such as a generator or utility grid. Regulator 10 may find application supplying regulated power to a wide variety of electronic devices or other types of loads including, for example, computers, telecommunication equipment and manufacturing and industrial control equipment. Regulator 10 may include a plurality of buck-boost transformers $16_1$, $16_2$, $16_3$ ... $16_N$, corresponding pluralities of control switches $18_1$, $18_2$, $18_3$ ... $18_N$, gate drivers $20_1$, $20_2$, $20_3$ ... $20_N$, a controller 22 and a user interface 24. It should be understood that the "N" in $16_N$, $18_N$, and $20_N$, is intended to indicate that the number of each component in regulator 10 may vary. Thus, while the illustrated embodiment shows a total of four transformers 16, control switches 18 and gate drivers 20, additional (or fewer) components may be used depending on the requirements of the system in which regulator 10 is employed.

Transformers $16_1$, $16_2$, $16_3$ ... $16_N$ comprise buck-boost transformers and are conventional in the art. Each of transformers $16_1$, $16_2$, $16_3$ ... $16_N$ includes a primary winding 26, and a secondary winding 28. The secondary windings 28 of transformers $16_1$, $16_2$, $16_3$ ... $16_N$ are electrically disposed in series between source 14 and load 12. Preferably, each of transformers $16_1$, $16_2$, $16_3$ ... $16_N$ includes a single (i.e., only one) primary winding 26 sized to the corrective power required for the combination of load current and corrective input range. As used herein, the terms "single" and "only one" mean that the primary winding 26 is capable of carrying voltages with both positive and negative polarities and, preferably, a null voltage as opposed to prior systems requiring multiple, separate primary windings to carry positive, negative and null polarity voltages. It should therefore be understood that a "single" or "only one" primary winding 26 as referred to herein could still comprise multiple parallel and/or series connected windings. Transformers $16_1$, $16_2$, $16_3$ ... $16_N$ are passive buck-boost transformers in that transformers $16_1$, $16_2$, $16_3$ ... $16_N$ cause a predetermined drop in voltage (buck) or rise in voltage (boost), or no voltage level change, in the line voltage across load 12. In accordance with the present invention, transformers $16_1$, $16_2$, $16_3$ ... $16_N$ are configured to generate different voltage level changes in the line voltage between source 14 and load 12. By configuring transformers $16_1$, $16_2$, $16_3$ ... $16_N$ to cause varying changes in the voltage level and by applying different polarities to the voltage in primary windings 26 of transformers $16_1$, $16_2$, $16_3$ ... $16_N$, a voltage regulator is provided that enables voltage regulation with a high resolution over a wide range yet requires relatively few components. For example, transformers $16_1$, $16_2$, $16_3$ may be configured to cause a 1%, 3% and 9% change in voltage level, respectively. By providing voltage to primary windings 26 of transformers $16_1$, $16_2$, $16_3$ (or by shunting some windings 26) and controlling the polarity of the voltage applied to each winding 26, regulator 10 can control voltage levels to within a +/−1% accuracy over a range of +/−13%. The addition of a fourth transformer 16 configured to cause a change in voltage level of ±0.33% would substantially increase resolution without impacting the range. Similarly, the addition of a fourth transformer 16 configured to cause change in voltage level of 27% would substantially increase the range (+/−40%) without impacting the resolution. The resolution and range are also scalable without adding additional transformers. For example, the transformers $16_1$, $16_2$, $16_3$ may be configured to cause a 2%, 6% and 18% change in voltage level, respectively, allowing regulator 10 to control voltage levels to within a +/−2% accuracy over a range of +/−26%. In the above-described embodiment of the invention, the voltage level changes caused by transformers $16_1$, $16_2$, $16_3$ ... $16_N$ differ by a predetermined factor and, particularly, a factor of 3 which provides for the optimum combination of resolution and range.

Figure 2:
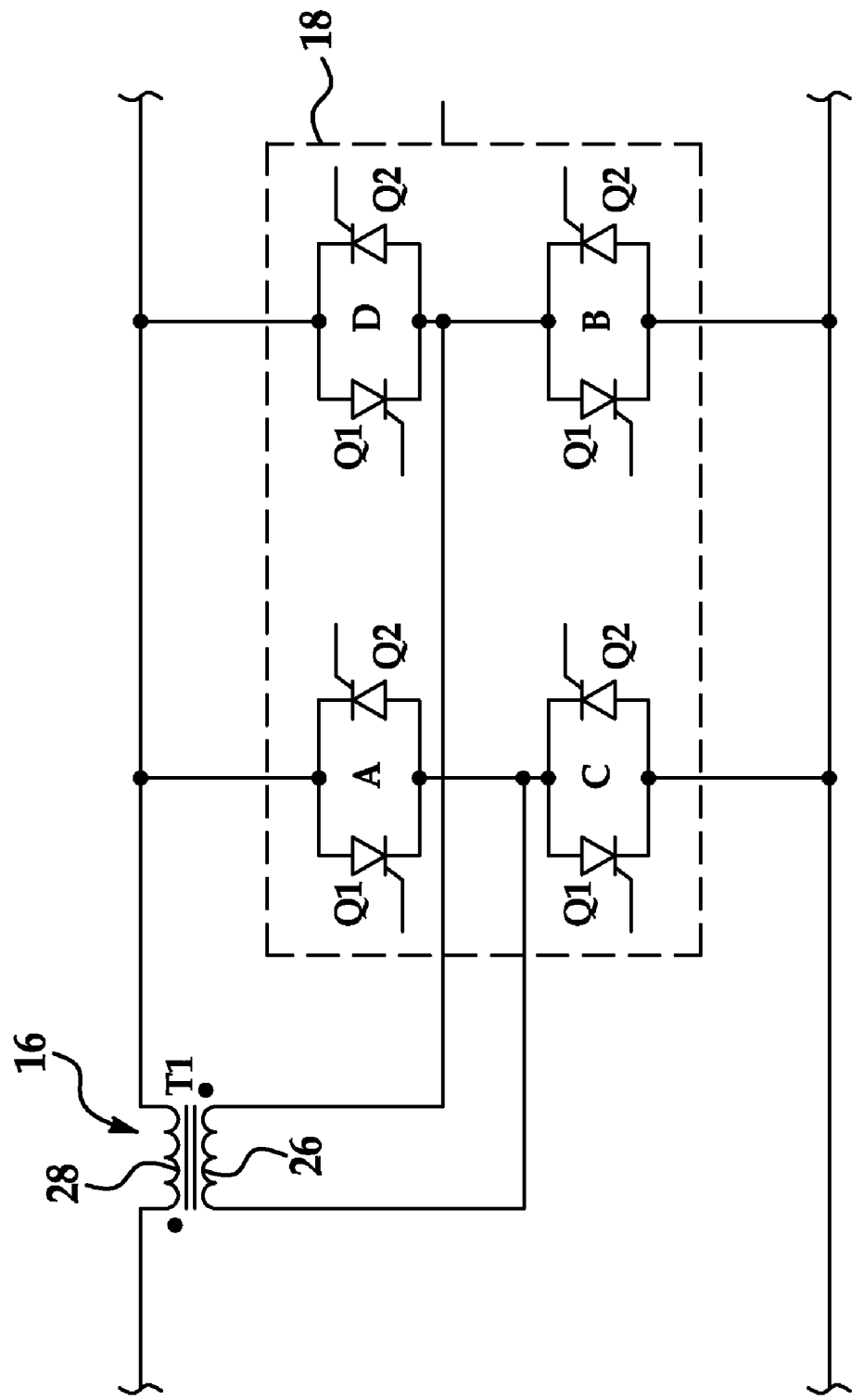
FIG. 2 is a schematic diagram illustrating a portion of the voltage regulator of FIG. 1.

Pluralities of control switches $18_1$, $18_2$, $18_3$ ... $18_N$ are provided to control the voltage across primary windings 26 of transformers $16_1$, $16_2$, $16_3$ ... $16_N$ and the polarity of that voltage. Referring to FIG. 2, each plurality of control switches $18_1$, $18_2$, $18_3$ ... $18_N$ may include four pairs of switches 30 arranged in an H-bridge configuration. The switches 30 in each pair of switches 30 are in parallel and are oriented in opposite directions. The switches 30 may comprise thyristors and, in particular, silicon control rectifiers (SCRs). Because switches 30 are located outside of the path of the load current on the primary side of transformers $16_1$, $16_2$, $16_3$ ... $16_N$, the current handling requirement of switches 30 is minimized. As a result, switches 30 may be made relatively small to reduce the size, weight and cost of regulator 10 and switches 30 are also partially protected from load faults/transients. Switches 30 are preferably mounted on heat sinks to cool switches 30.

Gate drivers $20_1$, $20_2$, $20_3$ ... $20_N$ are provided to control the voltage levels of control signals from controller 22 to account for different tolerances and requirements among the components of device 10. Gate drivers $20_1$, $20_2$, $20_3$ ... $20_N$, are conventional in the art. In one embodiment of the invention, gate drivers $20_1$, $20_2$, $20_3$ ... $20_N$, implement a control algorithm that monitors switches 30 and controls switching to prevent accidental shorting of the line voltage that can otherwise result from switch state interaction with load power factor as described in U.S. Pat. No. RE 38,625, the entire disclosure of which is incorporated herein by reference.

Controller 22 is provided to monitor the voltage across load 12 and to generate control signals for the pluralities of control switches $18_1$, $18_2$, $18_3$ ... $18_N$ in response thereto in order to maintain the voltage at a predetermined level or within a predetermined range. Controller 22 may comprise a programmable microprocessor or microcontroller or may comprise an application specific integrated circuit (ASIC). Controller 22 may include a central processing unit (CPU) and an input/output (I/O) interface through which controller 22 may receive a plurality of input signals including signals from user interface 24 and signals used to sense the voltage across load 12 and generate a plurality of output signals including those used to control switches $18_1$, $18_2$, $18_3$ ... $18_N$.

User interface 24 is provided to permit a user of regulator 10 to input certain operating parameters of regulator 10 and to receive information regarding operation of regulator 10 and the voltage level across load 12 as outputs. Interface 24 is conventional in the art and may include conventional I/O components such as a display screen, gauges, buttons, knobs, etc.

A voltage regulator 10 in accordance with the present invention represents a significant improvement as compared to conventional voltage regulators. The use of transformers $16_1$, $16_2$, $16_3$ ... $16_N$ configured to generate different voltage level changes in the line voltage and the control of the polarity of the voltage in the primary windings 26 of the transformers $16_1$, $16_2$, $16_3$ ... $16_N$ enables regulator 10 to achieve a high resolution (or accuracy) in the output voltage over a large voltage range and does so while using relatively few components. The overall size, cost and weight of regulator 10 is therefore less than conventional devices yet achieves increased resolution and range. The device also uses relatively few or no moving components and fewer components overall relative to conventional devices thereby increasing the reliability of the device. Because the control switches $18_1$, $18_2$, $18_3$ ... $18_N$ are located outside of the path of the load current on the primary side of the transformers $16_1$, $16_2$, $16_3$ ... $16_N$, smaller switching components can also be used, further reducing the size, weight and cost of regulator 10, and the switching components are partially protected against faults/transients.

While the invention has been shown and described with reference to one or more particular embodiments thereof, it will be understood by those of skill in the art that various changes and modifications can be made without departing from the spirit and scope of the invention.

We claim:
1. A voltage regulator, comprising:
a first buck-boost transformer having a primary winding and a secondary winding, said secondary winding of said first buck-boost transformer electrically disposed between an alternating current source and a load and in series with said source;
a first plurality of control switches configured to control a first voltage across said primary winding of said first buck-boost transformer at a moment in time;
a second buck-boost transformer having a primary winding and a secondary winding, said secondary winding of said second buck-boost transformer electrically disposed between said source and said load in series with said secondary winding of said first buck-boost transformer;

a second plurality of control switches configured to control a second voltage across said primary winding of said second buck-boost transformer at said moment in time; and, a controller configured to determine an output voltage and to generate control signals for said first and second pluralities of control switches in response to said output voltage wherein said first buck-boost transformer is configured to generate a first voltage level change in voltage between said source and said load, said second buck-boost transformer is configured to generate a second voltage level change in voltage between said source and said load, said second voltage level change different from said first voltage level change, and said first and second voltages are capable of assuming opposite polarities at said moment in time.

2. The voltage regulator of claim 1, further comprising:
a third buck-boost transformer having a primary winding and a secondary winding, said secondary winding of said third buck-boost transformer electrically disposed between said source and said load in series with said secondary winding of said second buck-boost transformer; and,
a third plurality of control switches configured to control a third voltage across said primary winding of said third buck-boost transformer at said moment in time,
said controller further configured to generate control signals for said third plurality of control switches in response to said output voltage.

3. The voltage regulator of claim 2 wherein said third buck-boost transformer is configured to generate a third voltage level change in voltage between said source and said load, said third voltage level change different from said first and second voltage level changes.

4. The voltage regulator of claim 2 wherein said third voltage is capable of assuming the same polarity or an opposite polarity relative to said first voltage and relative to said second voltage at said moment in time.

5. The voltage regulator of claim 1 wherein said first plurality of switches are arranged in an H-bridge.

6. The voltage regulator of claim 1 wherein said first plurality of switches includes four pairs of switches, each pair including two switches in parallel.

7. The voltage regulator of claim 6 wherein said switches in each pair of switches are oriented in opposite directions.

8. The voltage regulator of claim 1 wherein said first and second pluralities of switches comprise thyristors.

9. The voltage regulator of claim 8 wherein said first and second pluralities of switches comprise silicon control rectifiers.

10. The voltage regulator of claim 1 wherein said first and second voltage level changes differ by a predetermined factor.

11. The voltage regulator of claim 10 wherein said predetermined factor is three.

12. The voltage regulator of claim 1 wherein said primary winding of said first buck-boost transformer is the only primary winding of said first buck-boost transformer.

13. The voltage regulator of claim 1 wherein one of said first voltage level change and said second voltage level change comprises a null change.

14. A voltage regulator, comprising:
a first buck-boost transformer having a primary winding and a secondary winding, said secondary winding of said first buck-boost transformer electrically disposed between an alternating current source and a load and in series with said source;
a first plurality of control switches configured to control a first voltage across said primary winding of said first buck-boost transformer at a moment in time;
a second buck-boost transformer having a primary winding and a secondary winding, said secondary winding of said second buck-boost transformer electrically disposed between said source and said load in series with said secondary winding of said first buck-boost transformer;
a second plurality of control switches configured to control a second voltage across said primary winding of said second buck-boost transformer at said moment in time; and,
a controller configured to determine an output voltage and to generate control signals for said first and second pluralities of control switches in response to said output voltage
wherein said first buck-boost transformer is configured to generate a first voltage level change in voltage between said source and said load, said second buck-boost transformer is configured to generate a second voltage level change in voltage between said source and said load, said second voltage level change different from said first voltage level change, and said first voltage across said primary winding of said first buck-boost transformer assumes one of a positive polarity and a negative polarity at said moment in time and assumes another of said positive polarity and said negative polarity at another moment in time.

15. The voltage regulator of claim 14 wherein said first voltage across said primary winding of said first buck-boost transformer assumes a null change at yet another moment in time.

16. The voltage regulator of claim 14 wherein said second voltage across said primary winding of said second buck-boost transformer assumes one of a positive polarity and a negative polarity at said moment in time and assumes another of said positive polarity and said negative polarity said another moment in time.

17. The voltage regulator of claim 16 wherein said second voltage across said primary winding of said second buck-boost transfer assumes a null change at yet another moment in time.

18. The voltage regulator of claim 14 wherein said first plurality of switches are arranged in an H-bridge.

19. The voltage regulator of claim 14 wherein said first and second voltage level changes differ by a predetermined factor.

20. The voltage regulator of claim 19 wherein said predetermined factor is three.

* * * * *